UNITED STATES PATENT OFFICE.

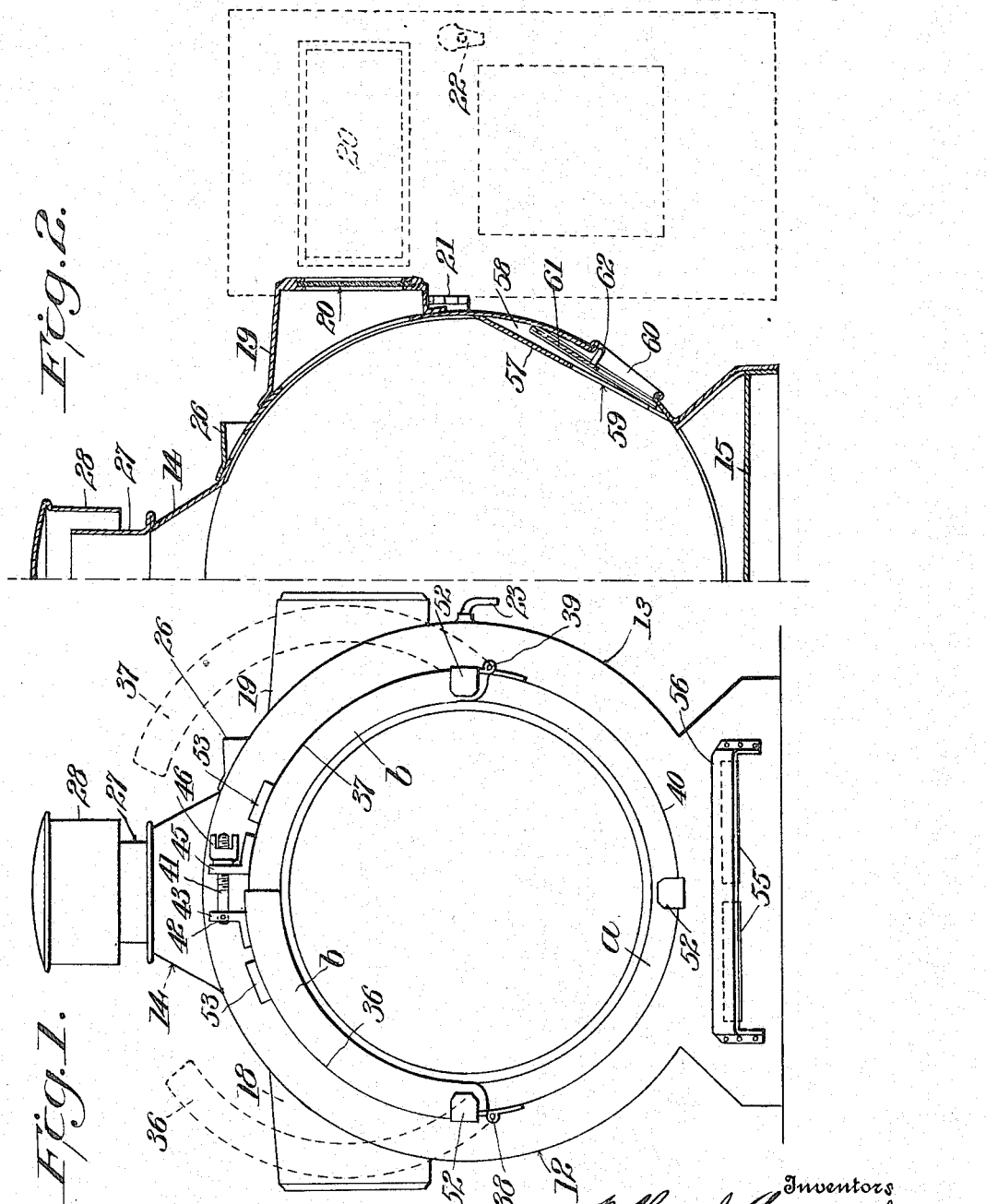

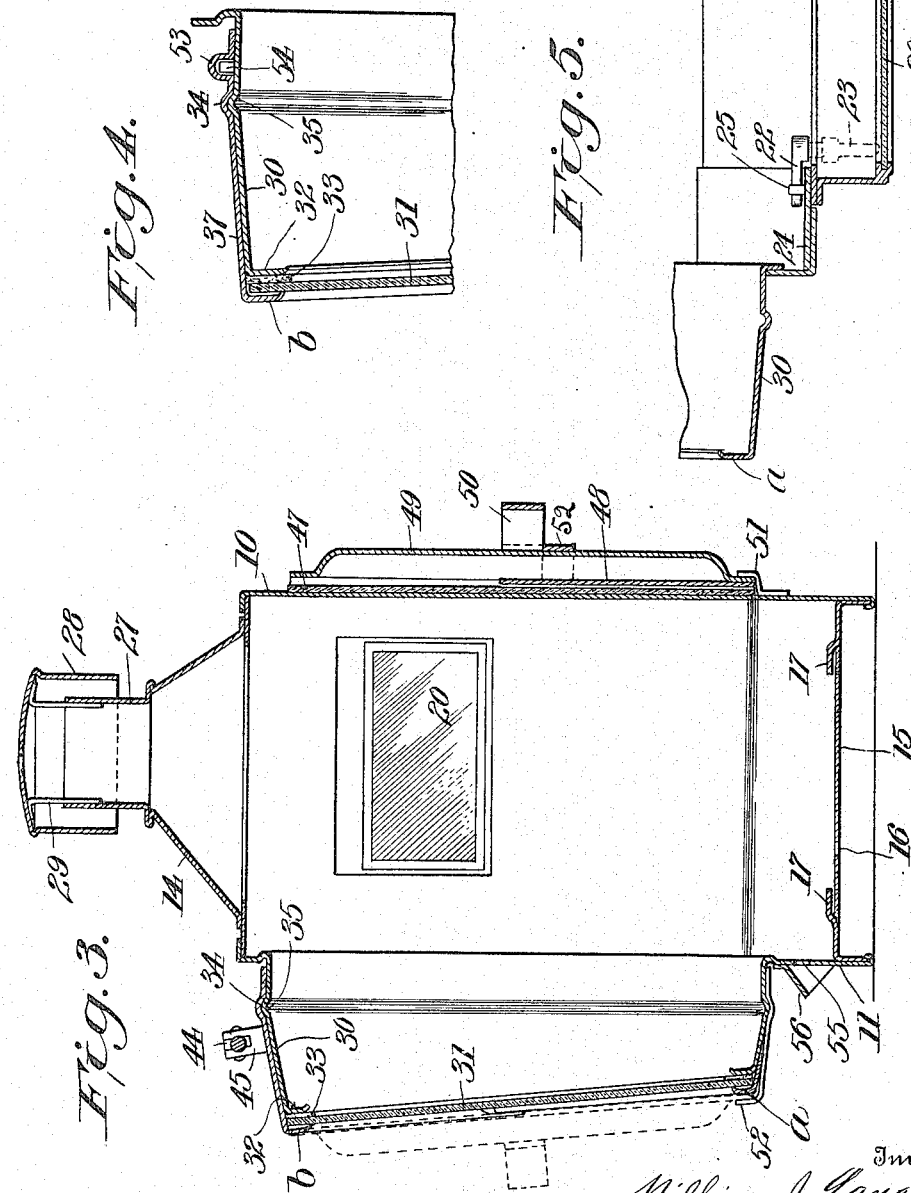

WILLIAM J. LANGE AND EUGENE C. RODDIE, OF NEW ORLEANS, LOUISIANA.

HEADLIGHT.

1,122,209. Specification of Letters Patent. Patented Dec. 22, 1914.

Application filed June 13, 1913. Serial No. 773,565.

*To all whom it may concern:*

Be it known that we, WILLIAM J. LANGE and EUGENE C. RODDIE, citizens of the United States, residing at the city of New Orleans, in the parish of Orleans and State of Louisiana, have invented certain new and useful Improvements in Headlights, of which the following is a specification.

This invention relates to head lights.

One object is to provide a head light particularly adapted to support the glass at a downward angle so as to direct the light downward on the track and to carry the glass in such a way as to permit contraction and expansion incident to climatic conditions or to the heat derived from the lamp and also to enable replacing the glass in the event of breakage without the necessity of taking the device to the shops.

Another object is to provide for the easy insertion and withdrawal of the front glass and to permit the use of ordinary window glass instead of expensive lenses, the latter being usable, however, if desired; and to provide such arrangement of ventilation as to prevent heat from the lamp endangering the window glass to breakage.

Another object resides in the provision of a head light embodying among other characteristics means whereby an extra glass may be carried by the head light for use to replace a broken glass, if breakage should occur, with the projecting glass carried by the head light without the use of cement so that, in the event of breakage a broken glass may be readily replaced by the extra one carried for the purpose.

Another object resides in the provision of a head light provided with means whereby an efficient ventilation is had to overcome the possibility of cracking of the glass incident to heat from the lamp.

A still further object resides in the provision of a head light embodying a hinged side which may be opened to permit the insertion or withdrawal of the lamp and which is provided with a hand hole of such size and proportions as to enable adjustment of the light through the hand hole, obviating the necessity of opening the hinged side.

With the above and other objects in view the present invention consists in the combination and arangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings: Figure 1 is a front elevation of the invention, parts being shown in dotted lines. Fig. 2 is a vertical sectional view through one half of the head light illustrating the hinged side open in dotted lines. Fig. 3 is a vertical sectional view of the invention. Fig. 4 is a fragmentary sectional view of the glass frame and the means coöperating therewith for the support of the glass. Fig. 5 is a fragmentary horizontal sectional view through the head light.

Referring now more particularly to the accompanying drawings there is illustrated one embodiment of my invention wherein there is shown a head light embodying a body portion including a back 10, a front 11, sides 12 and 13, a dome 14 and a bottom 15. The bottom is provided with a plurality of air passages 16 in the form of apertures for the admission of air currents and on its upper inner side it is provided with oppositely disposed flanges 17 which coöperate to form a guide for the slidable reception of the lamp (not shown).

The sides 12 and 13 are provided with window casings 18 and 19, respectively, in each of which is disposed a glass 20 that the light from the lamp (not shown) may be seen through the sides of the head light. The side 12 is fixed. The side 13 is hingedly connected at 21 to the back 10 of the head light forming a swinging door by virtue of which the lamp (not shown) may be inserted and withdrawn from the device. It has at its free edge a latch 22 adapted to be turned by the handle 23 into engagement with the inner face 24 of the door opening. A stop 25 limits the turning movement of the latch 22 to locking position. At the top of the door opening is an outwardly extending ledge 26 which prevents the ingress of sleet, water or the like, when the hinged side or door is closed and this ledge 26 serves as a guide or means of forcing the hinged side or door to a proper position with relation to the door opening, said latch insuring a tight closing of the door to prevent undue air currents. The air passing through the aforesaid apertures 16 of the bottom 15 of the head light passes upwardly through the body of the device and out through the outlet 27 of the dome 14 and between the outer surface of the outlet 27 and the inner surface of the cap 28 secured by means of suitable fastenings 29 to the outlet 27 of the dome.

Formed at the front of the head light is a glass supporting frame 30 provided with a circular opening to receive a glass 31 by which the light is projected from the head light. The glass frame 30 has its outer edge formed upon a downward and inward incline so that the light may be projected downwardly and at its edges the glass frame 30 is provided with an annular flange 32 against which a ring of asbestos may be disposed.

An annular ring like member embraces the annular glass frame 30 and is provided with an internal groove 34 adapted to fit over the external rib 35 of the glass frame so as to secure the annular ring-like member to said frame. The upper semi-annular portion of this ring-like member is divided into two sections 36 and 37 whose lower ends are hinged at 38 and 39, respectively, to the lower semi-annular ring-like member 40. The free ends of the sections 36 and 37 are adapted to overlap as shown in Fig. 1 and are held in overlapping relation by means of a locking element 41 pivoted at 42 to the lug 43 secured on the ring-like section 36 and adapted to engage in the slots 44 of the lug 45 secured to the section 37, there being a thumb nut 46 having working fit on the screw threaded portion of the bolt 41 to lock the free ends of the sections 36 and 37 together and clamp the sections on the glass frame. The semi-annular section 40 and the two sections 36 and 37 composing the upper semi-annular portions of the ring-like member have flanges $a$ and $b$, respectively, which coöperate with the aforesaid annular flange 32 to secure the glass 31 against the asbestos packing 33. To insert the glass 31 the sections 36 and 37 of the ring-like member are opened up as indicated in dotted lines in Fig. 1. The glass 31 is then inserted into the pocket formed by the annular flange 32 and the semi-annular flange $a$ of the lower portion of the ring-like member. The sections 36 and 37 are then thrown to closed position and locked as shown in full lines in Fig. 1 as should now be understood. By virtue of this mounting of the glass it is movable and is permitted to contract and expand incident to climatic conditions or to the heat due to the lamp within the device and is thereby not subject to breakage as in a case where the glass is fixedly mounted. A further advantage resides in the fact that if the glass becomes broken for any reason a trainman may insert a new glass, thereby obviating the necessity of waiting until a shop is reached, where more or less time is lost in mending the glass or taking out the broken one and inserting a new one.

For the convenience of the trainmen a separate glass 47 may be carried at the back of the device. For instance there is shown a substantially semi-annular wall 48 secured by means of fingers to the back 10 in spaced relation thereto and in which the glass 47 may be readily slipped, supported, carried and removed without danger of breakage. This glass 47 may be further protected by a cover 49 provided with a handle 50 and which may be supported at its lower edge on a seat 51 and by a strip 52 secured to the back 10 slightly below the upper edge of the semi-annular wall 48, as clearly shown in Fig. 3. This cover 49, it may be stated, may be shifted from the back of the device to the front thereof to completely cover the glass 31 in the day or at any time desired in order to protect the front glass. One way in which the cover 49 may be supported at the front of the head light over the front glass 31 is to employ three or more fingers 52 as shown clearly in Figs. 1 and 3, the cover 49 being shown in dotted lines in Fig. 3.

As a means to prevent rattling and coöperate with the rib and groove feature 34 and 35 between the glass frame and the annular ring like member 36—37—40, the sectional members 36 and 37 of the annular ring like member have sockets 53 (see Figs. 1 and 4) which fit over pins 54 carried by the glass frame. To prevent undue heating of the glass there is provided at the front of the head light below the glass frame one or more apertures 55 shielded by a ledge 56 to exclude water, sleet and the like from the interior of the head light and which provide for the admission of an air current immediately under the glass so that there is colder air passing up continually between the glass and the lamp thereby reducing the temperature sufficiently to prevent cracking of the glass incident to the heat from the lamp. The hinged side 13 carries a partition member 57 forming an interspace 58 between it and the wall of the side 13. The partition 57 and the hinge side 13 have alining openings 59 and 60, respectively, so that the hand may be thrust inside of the device to adjust the light without the necessity of opening the door 13. The openings 59 and 60 are closed by a door 61 provided with a handle operating piece 62.

From the foregoing it will be seen that I provide a comparatively simple, inexpensive, durable and efficient head light embodying means whereby provision is made against accidental breakage of the projecting glass incident to normal conditions and wherein, in the event of breakage there is carried by the head light itself an extra glass to be substituted for the broken glass and that either one or the other of these glasses may be protected, if desired, with the projecting glass arranged loose enough to permit play and thereby prevent breakage incident to expansion and contraction. It will also be understood that in head lights wherein arc electric lamps are in use that such lamps emit such heat as to break the glass and one of the objects of the present invention embodies such characteristics that this arc electric lamp may be used without danger of breaking the projecting glass. The front glass may be easily inserted or withdrawn; ordinary window glass may be used instead of expensive lenses; although the latter may be used if desired; and the ventilation arrangement is such that the heat from the lamp does not endanger the glass to accidental breakage.

What is claimed is:—

1. A headlight of the character described provided with a front glass frame, a glass in the frame, the headlight having ventilating openings in its bottom and in its front beneath the glass frame having elongated ventilating openings to admit air so as to prevent heat of the lamp from breaking the glass, and a shield for said elongated openings, said shield being secured above said elongated openings and having its lower edge flush with the lower edges of said openings.

2. The combination of a head light, and a wall carried by the rear of the headlight, whose upper edge terminates about midway between the top and bottom of the head light, and which is spaced from the body of the head light to form a pocket for the reception of an extra glass, said pocket terminating substantially midway of said glass.

3. A head light of the character described, comprising a body portion including a fixed and a hinged side, means for locking the hinged side, the body portion having ventilating passages, a glass frame projecting from the body portion and provided with an annular flange, a ring-like member embracing the glass frame and composed of sections two of which are hingedly connected to the other section with each section of the ring-like member flanged to coöperate with the flange of the glass frame to form a recess in which the glass is clamped, means for locking said hinged sections of the ring-like member together, and means for locking the hinged side of the body portion.

4. A head light of the character described, comprising a body portion including a fixed and a hinged side, means for locking the hinged side, the body portion having ventilating passages, a glass frame projecting from the body portion and provided with an annular flange, a ring-like member embracing the glass frame and composed of sections two of which are hingedly connected to the other section with each section of the ring-like member flanged to coöperate with the flange of the glass frame to form a recess in which the glass is clamped, means for locking said hinged sections of the ring-like member together, the hinged side having a hand hole, and means for closing the hand hole.

5. A head light of the character described, comprising a body portion including a fixed and a hinged side, means for locking the hinged side, the body portion having ventilating passages, a glass frame projecting from the body portion and provided with an annular flange, a ring-like member embracing the glass frame and composed of sections two of which are hingedly connected to the other section with each section of the ring-like member flanged to coöperate with the flange of the glass frame to form a recess in which the glass is clamped, means for locking said hinged sections of the ring-like member together, means for the support of an extra glass and a cover removably supported by the head light to cover said extra glass.

6. A head light of the character described, comprising a body portion including a fixed and a hinged side, means for locking the hinged side, the body portion having ventilating passages, a glass frame projecting from the body portion and provided with an annular flange, a ring-like member embracing the glass frame and composed of sections two of which are hingedly connected to the other section with each section of the ring-like member flanged to coöperate with the flange of the glass frame to form a recess in which the glass is clamped, means for locking said hinged sections of the ring-like member together, the hinged side having a hand hole, means for closing the hand hole, means for the support of an extra glass, and a cover removably supported by the head light to cover said extra glass.

7. A headlight of the character described comprising a body portion provided with ventilating passages, a glass frame projecting from the body portion and provided with an annular flange, and a ring like member embracing the glass frame and composed of sections, two of which are hingedly connected to the other section with each section of the ring like member flanged to coöperate with the flange of the glass frame to form a recess in which the glass is clamped.

8. A headlight of the character described comprising a body portion provided with ventilating openings and with a front glass frame, a glass in the frame, means for securing the glass removably on the frame, a ring like member embracing the glass frame and composed of sections, two of which are connected to the other section, and means having connection with the two hinged sections of the ring-like member whereby they may be locked together.

9. A headlight of the character described comprising a body portion, a glass frame projecting forwardly from the body portion and provided with an annular flange, a semi-annular member secured to the glass frame and provided with a flange spaced from the aforesaid flange of the glass frame to support the glass.

10. A headlight of the character described comprising a body portion, a glass frame projecting forwardly from the body portion and provided with an annular flange, a semi-annular member secured to the glass frame and provided with a flange spaced from the aforesaid flange of the glass frame to support the glass, and means for locking the glass in said supporting means.

11. In a head light, a front glass frame, an annular flange formed thereon, a removable glass panel engaging said flange, an annular member embracing said front glass frame, said annular member comprising a plurality of hinged sections, means for removably attaching said hinged sections to the front glass frame, and clips upon said annular member coöperating with the flange and removably supporting the glass panel.

In testimony whereof we have affixed our signatures in presence of two witnesses.

WILLIAM J. LANGE.
EUGENE C. RODDIE.

Witnesses:
FRANK B. TWOMEY,
FELIX J. DREYFUS.